US007864169B2

(12) United States Patent
Chimura

(10) Patent No.: US 7,864,169 B2
(45) Date of Patent: Jan. 4, 2011

(54) ACTIVE MATRIX PANEL

(75) Inventor: Hidehiko Chimura, Kanagawa (JP)

(73) Assignee: Semiconductor Energy laboratory Co., Ltd. (JP)

( * ) Notice: Subject to any disclaimer, the term of this patent is extended or adjusted under 35 U.S.C. 154(b) by 637 days.

(21) Appl. No.: 11/985,507

(22) Filed: Nov. 15, 2007

(65) Prior Publication Data

US 2008/0084375 A1 Apr. 10, 2008

Related U.S. Application Data

(63) Continuation of application No. 10/914,906, filed on Aug. 10, 2004, now Pat. No. 7,348,971, which is a continuation of application No. 08/539,051, filed on Oct. 4, 1995, now Pat. No. 6,798,394.

(30) Foreign Application Priority Data

Oct. 7, 1994 (JP) .................................. 6-270565

(51) Int. Cl.
*G06F 3/038* (2006.01)

(52) U.S. Cl. ........................ 345/206; 345/204; 349/151

(58) Field of Classification Search ................... 345/87, 345/98, 204, 206; 257/59, 146; 349/151; 438/128

See application file for complete search history.

(56) References Cited

U.S. PATENT DOCUMENTS

| | | | |
|---|---|---|---|
| 4,409,724 A | | 10/1983 | Tasch, Jr. et al. |
| 4,825,202 A | | 4/1989 | Dijon et al. |
| 5,010,326 A | | 4/1991 | Yamazaki et al. |
| 5,021,774 A | | 6/1991 | Ohwada et al. |
| 5,036,317 A | | 7/1991 | Buzak |
| 5,250,931 A | | 10/1993 | Misawa et al. |
| 5,408,252 A | | 4/1995 | Oki et al. |
| 5,426,526 A | * | 6/1995 | Yamamoto et al. ............ 349/42 |
| 5,525,957 A | | 6/1996 | Tanaka |
| 5,581,092 A | | 12/1996 | Takemura |
| 5,608,251 A | | 3/1997 | Konuma et al. |
| 5,620,905 A | | 4/1997 | Konuma et al. |
| 5,637,187 A | | 6/1997 | Takasu et al. |
| 5,754,158 A | | 5/1998 | Misawa et al. |
| 5,838,327 A | | 11/1998 | Seong |

(Continued)

FOREIGN PATENT DOCUMENTS

EP 0 275 140 A2 7/1988

(Continued)

*Primary Examiner*—Abbas I Abdulselam
(74) *Attorney, Agent, or Firm*—Husch Blackwell LLP Welsh Katz

(57) ABSTRACT

In an active matrix panel, a pixel matrix which includes a plurality of gate lines, a plurality of source lines, and thin film transistors is formed on a first transparent substrate. A second transparent substrate is formed opposite to the first transparent substrate. A liquid crystal material is disposed between the first and second transparent substrates. A gate line driver circuit and a source line driver circuit are formed by a P-type, an N-type, a complementary type thin film transistors (including silicon film) or the like on the first transparent substrate. Also, a data processing circuit for performing mask processing or the like is formed by the thin film transistors or the like on the first transparent substrate.

20 Claims, 8 Drawing Sheets

U.S. PATENT DOCUMENTS

| | | | |
|---|---|---|---|
| 5,939,731 | A | 8/1999 | Yamazaki et al. |
| 5,982,461 | A | 11/1999 | Hayashi et al. |
| 6,067,062 | A | 5/2000 | Takasu et al. |
| 6,104,369 | A | 8/2000 | Inamori et al. |
| 6,137,464 | A | 10/2000 | Inamori et al. |
| 6,304,243 | B1 | 10/2001 | Kondo et al. |

FOREIGN PATENT DOCUMENTS

| | | | |
|---|---|---|---|
| EP | 0 474 474 | A2 | 3/1992 |
| EP | 0 497 980 | A1 | 8/1992 |
| EP | 0 507 639 | A2 | 10/1992 |
| EP | 0 593 266 | A2 | 4/1994 |
| EP | 0 588 398 | A2 | 11/1997 |
| EP | 0 588 398 | A3 | 11/1997 |
| EP | 0 588 398 | B1 | 11/1997 |
| JP | 61-137194 | | 6/1986 |
| JP | 63-217326 | | 9/1988 |
| JP | 1-289917 | | 11/1989 |
| JP | 2-84770 | | 3/1990 |
| JP | 4-97292 | | 3/1992 |
| JP | 4-181227 | | 6/1992 |
| JP | 4-350627 | | 12/1992 |
| JP | 4-362924 | | 12/1992 |
| JP | 5-93922 | | 4/1993 |
| JP | 5-134270 | | 5/1993 |
| JP | 5-203991 | | 8/1993 |
| JP | 5-210364 | | 8/1993 |
| JP | 6-123896 | | 5/1994 |
| JP | 6-160039 | | 6/1994 |
| JP | 6-202160 | | 7/1994 |
| JP | 7-140938 | | 6/1995 |

* cited by examiner

COORDINATE

| | | |
|---|---|---|
| (x-1,y-1) | (x,y-1) | (x+1,y-1) |
| (x-1,y) | (x,y) | (x+1,y) |
| (x-1,y+1) | (x, y+1) | (x+1,y+1) |

IMAGE DATA (GRADATION)

| | | |
|---|---|---|
| P(x-1,y-1) | P(x,y-1) | P(x+1,y-1) |
| P(x-1,y) | P(x, y) | P(x+1,y) |
| P(x-1,y+1) | P(x,y+1) | P(x+1,y+1) |

ACTIVE MATRIX PANEL

This application is a continuation of U.S. application Ser. No. 10/914,906, filed on Aug. 10, 2004 now U.S. Pat. No. 7,348,971 which is a continuation of U.S. application Ser. No. 08/539,051, filed on Oct. 4, 1995 (now U.S. Pat. No. 6,798,394 issued Sep. 28, 2004).

BACKGROUND OF THE INVENTION

1. Field of the Invention

The present invention relates to an active matrix panel using thin film transistors (TFTs).

2. Description of the Related Art

FIG. 12 shows a conventional active matrix panel. In an active matrix panel 12001, as disclosed in Japanese Patent unexamined published No. 1-289917, a source line driver circuit 12002, a gate line driver circuit 12003, and a pixel matrix 12004 are formed on the same (single) substrate.

The source line driver circuit 12002 has a shift register 12005 and a sample holding circuit 12006 formed by TFTs and is connected to the pixel matrix 12004 through a source line 12007.

The gate line driver circuit 12003 has a shift register 12008 and a buffer circuit 12009 and is connected with the pixel matrix 12004 through a gate line 12010.

In the pixel matrix 12004, a pixel 12012 is formed at a intersection of the source line 12007 and the gate line 12010 and has a TFT 12013 and a liquid crystal cell 12014.

FIG. 13 shows a system for processing image data stored in a memory device such as a random access memory (RAM) using a software by a microcomputer. This system has a liquid crystal display device 13001, a digital signal/analog signal converting circuit (D/A converting circuit) 13002, an image data memory device 13003, an image processing system 13004 including a microcomputer (not shown), a data bus 13005, and an address bus 13006. Numeral 13007 represents a memory device control signal, numeral 13008 represents a control signal for the liquid crystal display device 13001 and the D/A converting circuit 13002.

The operation is described below. The contents of image processing are programmed by C language or the like and then compiled in the system 13004. In accordance with the contents of the image processing, the image data stored in the memory device 13003 is read out on the data bus 13005, and then data processing is performed by the system 13004. The processed image data is stored in the memory device 13003 or displayed on the liquid crystal display device 13001 through the DA converting circuit 13002. Thus, the liquid crystal display device 13001 has only function for displaying the image data.

In a conventional active matrix panel, there are the following problems.

(1) Miniaturization of a Display Device and a System is Hindered.

Conventionally, as shown in FIG. 12, since an active matrix panel has only a circuit for driving each pixel in a pixel matrix, access to a circuit for displaying the pixel circuit, in particular, an image processing system, is performed from an external of the active matrix panel. Recently, because of increase of image data and complication of data processing, processing in an external is increased, so that the amount of the data processing exceeds processing capacity of a microprocessing unit (MPU). Accordingly, in order to decrease the amount of data processing of the MPU, an exclusive external processing unit is incorporated in a semiconductor integrated circuit. However, this increases the number of parts for an image display apparatus having image processing operation and hinders miniaturization of a system.

(2) A Region which is not Used is Present in a Panel.

Since a conventional active matrix panel includes driver circuits for pixels, gate lines and source lines, a region which is not used is present in a panel. If an external part can be arranged in the region, further miniaturization of a display system can be performed by effectively using a physical space.

(3) A High Speed Operation of a System for Performing Image Processing is Prevented.

In order to control pixels, it is necessary to operate an MPU in a system other than a panel. However, since an image processing technique is complexed year by year and therefore a software is complexed and increased, a data processing time of an MPU is increased and an access time to a memory device is also increased. This is because an MPU ensures a data bus to access the memory device. To solve this, it is effective to perform parallel processing by using a special purpose hardware. However, the number of parts increases. Therefore, the number of parts is decreased. By this, a system cannot be operated at a high speed, so that a process time of a MPU is further increased.

SUMMARY OF THE INVENTION

An object of the present invention is to solve the above problems and to provide an active matrix panel having a high speed with miniaturization.

According to the present invention, there is provided an active matrix panel including: a first transparent substrate; a second transparent substrate arranged opposite to the first transparent substrate; a liquid crystal material arranged between the first and second transparent substrate, wherein the first transparent substrate includes, a plurality of gate lines, a plurality of source lines, a plurality of pixel thin film transistors formed in intersections of the gate lines and the source lines, a gate line driver circuit which is formed by first thin film transistors and connected to the gate lines, a source line driver circuit which is formed by second thin film transistors and connected to the source line, and a processing circuit, formed by the third thin film transistors, for processing signals supplied to the source lines.

The processing circuit has at least one of the following elements:

(1) a standard clock generator circuit constructed by a P-type, an N-type or a complementary type MOS transistor formed using a silicon film, or a thin film diode of MIM (metal-insulator metal), NIN, PIP, PIN, NIP or the like;

(2) a counter circuit constructed by a P-type, an N-type or a complementary type MOS transistor formed using a silicon film, or a thin film diode of MIM (metal-insulator metal), NIN, PIP, PIN, NIP or the like;

(3) a divider circuit constructed by a P-type, an N-type or a complementary type MOS transistor formed using a silicon film, or a thin film diode of MIM (metal-insulator metal), NIN, PIP, PIN, NIP or the like;

(4) a transferring element circuit for transferring a signal from external to the active matrix panel, constructed by a P-type, an N-type or a complementary type MOS transistor formed using a silicon film, or a thin film diode of MIM (metal-insulator metal), NIN, PIP, PIN, NIP or the like;

(5) a transferring element circuit for transferring a signal from the active matrix panel to the external, constructed by a P-type, an N-type or a complementary type MOS transistor formed using a silicon film, or a thin film diode of MIM (metal-insulator metal), NIN, PIP, PIN, NIP or the like; and (6) a transferring element circuit for transferring a signal from the active matrix panel to external and transferring a signal from the external to the active matrix panel, constructed by a P-type, an N-type or a complementary type MOS transistor formed using a silicon film, or a thin film diode of MIM (metal-insulator metal), NIN, PIP, PIN, NIP or the like.

In the above structure of the present invention, the image data is read out from a plurality of memory devices for storing image data under readout control and then processed, so that the processed image data is transferred to pixels to display the image data on the pixels. That is, in the active matrix panel, a pixel matrix is driven, and further, processing, signal transfer from the active matrix panel to the external, and control of memory devices can be performed.

Therefore, without operation of an MPU, image data is processed and displayed on the pixel matrix by direct accesses to the plurality of memory devices, and the number of parts for data processing can be small.

DETAILED DESCRIPTION OF THE PREFERRED EMBODIMENTS

Embodiment 1

In the embodiment, a method for mask processing (decrease of noise of an image) is described as concrete image processing. The mask processing is necessary to correct an image, in particular, to remove isolated point noise in a case wherein image data is produced from image reading apparatus such as a handy scanner.

Figure 1:
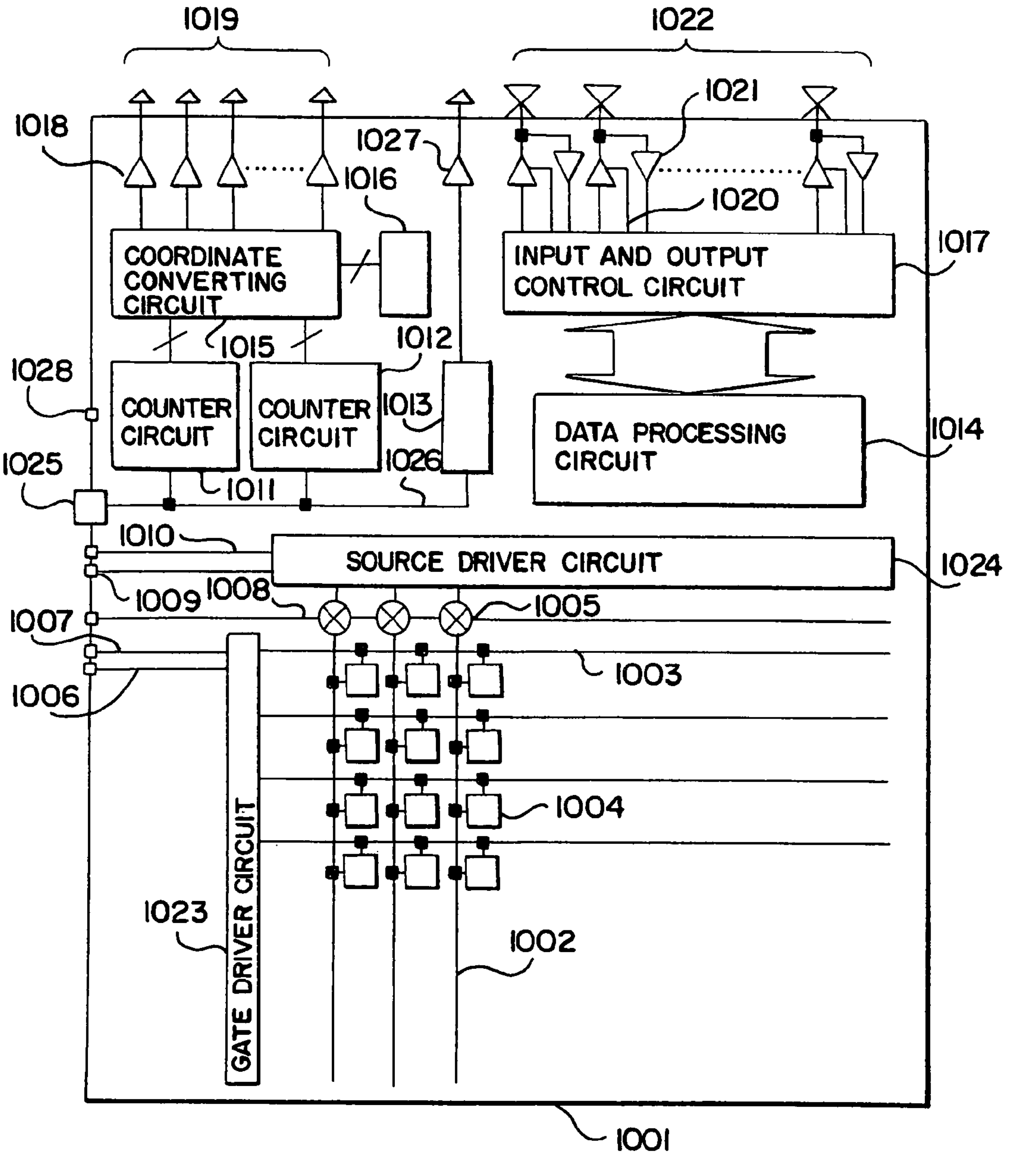
FIG. 1 shows an active matrix panel of an embodiment of the present invention.

FIG. 1 shows an active matrix panel of Embodiment 1, and the following circuits are formed on the same transparent substrate.

In an active matrix panel 1001, a source line 1002 having N-lines and a gate line 1003 having M-lines are provided at a matrix form, and pixels 1004 are connected to intersections of the source line 1002 and the gate line 1003, respectively. Accordingly, since the pixels 1004 are provided at N×M matrices by arranging N-pixels in a horizontal direction (X-direction) and M-pixels in a vertical direction (Y-direction), a desired one of the pixels 1004 can be determined by designating an address A(x,y).

The source line 1002 is connected to a source driver circuit 1024 through sample hold circuits 1005. The gate line 1003 is connected to the outputs of a gate driver circuit 1023. A clock line 1006 and a start line 1007 are connected to the inputs of the gate driver circuit 1023. A video line 1008 is connected to the input of the sample hold circuit 1005. A clock line 1009 and a start line 1010 are connected to the source driver circuit 1024. The gate driver circuit 1023 and the source driver circuit 1024 are formed by using a P-type, an N-type, or a complementary type MOS thin film transistor (TFT), or a thin film diode of MIM (metal-insulator metal), NIN, PIP, PIN, NIP or the like.

Also, in the active matrix panel 1001, a circuit for designating an address of the pixels 1004 to be mask-processed is provided. Through a standard clock line 1026, the output of a standard clock generating circuit 1025 is connected to an X-coordinate counter circuit 1011 for counting an X-coordinate value, a Y-coordinate counter circuit 1012 for counting a Y-coordinate value, and a memory device control circuit 1013 for generating a clock signal to control read and write to external memory devices (not shown). The outputs of the counter circuits 1011 and 1012 are sequentially connected to a coordinate converting circuit 1015 which is connected to an address holding circuit 1016, address buffers 1018, and address buses 1019, and output to an external control portion (not shown). The output of the memory device control circuit 1013 is connected to the external control portion outside the active matrix panel 1001 through a clock buffer 1027 by a signal on an averaging start signal line 1028. The counter circuits 1011 and 1012, the memory device control circuit 1013, the coordinate converting circuit 1015, and the address holding circuit 1016 are formed by using a P-type, an N-type, or a complementary type MOS TFT, or a thin film diode of MIM (metal-insulator metal), NIN, PIP, PIN, NIP or the like.

Further, in the active matrix panel 1001, a data processing circuit 1014 for performing image processing is provided. An input and output control circuit 1017 which can read and write data, an input and output select signal line 1020, bidirectional buffers 1021, and data buses 1022 are sequentially connected to the data processing circuit 1014, and each element can input and output a signal (data). The data buses 1022 are connected to the external control portion outside the active matrix panel 1001. The data processing circuit 1014 and the input and output control circuit 1017 are formed by using a P-type, an N-type, or a complementary type MOS TFT, or a thin film diode of MIM (metal-insulator metal), NIN, PIP, PIN, NIP or the like.

Figure 2:
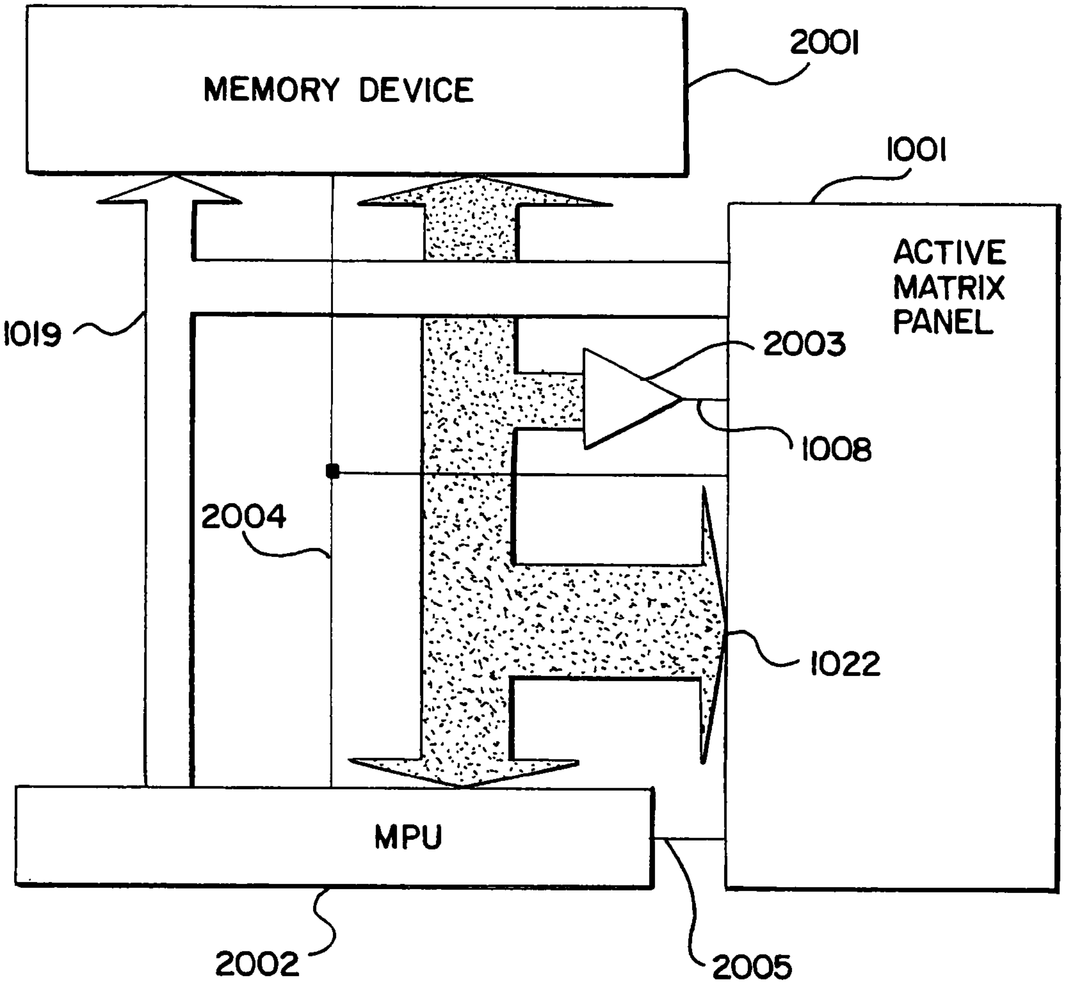
FIG. 2 shows a display system of the embodiment.

FIG. 2 shows a display system. A memory device 2001 for storing image data and a microprocessing unit (MPU) 2002 for controlling the entire system are provided outside the active matrix panel 1001. By the address buses 1019, the outputs of the active matrix panel 1001 and the MPU 2002 are connected to the memory device 2001. Also, by the data buses 1022, the bidirectional buffer 1021 of the active matrix panel 1001, the memory device 2001, and the MPU 2002 can input and output a signal (data). The data buses 1022 are connected to a D/A converter 2003. The D/A converter 2003 is connected to the active matrix panel 1001 through the video signal line 1008. By a memory device control line 2004, the active matrix panel 1001 is connected to the memory device 2001 and the MPU 2002. Also, by a control signal line 2005, the active matrix panel 1001 is connected to the MPU 2002.

Figure 8:
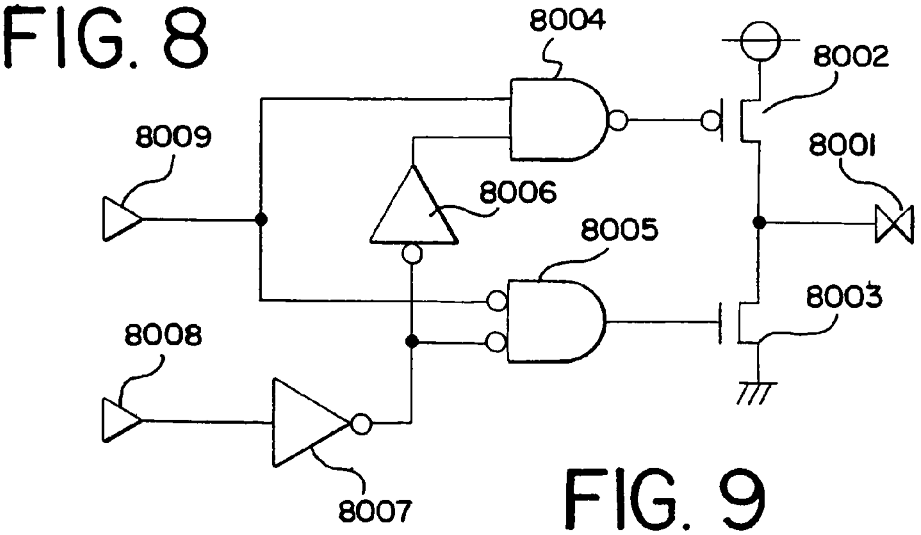
FIGS. 8 and 9 show a bidirectional buffer.
Figure 9:
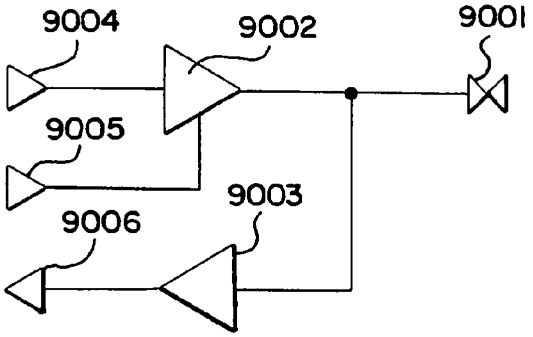

FIGS. 8 and 9 show examples of a bidirectional buffer. In FIG. 8, an output pin 8001 is connected to a connection terminal connecting a drain electrode of a P-type transistor 8002 with a source electrode of an N-type transistor 8003. A gate electrode of the P-type transistor 8002 is connected to the output of an NAND circuit 8004, and a gate electrode of the N-type transistor 8003 is connected to the output of an NOR circuit 8005. One of input terminals of the NAND circuit 8004 is connected to an input pin 8009, and the other input terminal of the NAND circuit 8004 is connected to an inverter circuit 8006. Also, one of input terminals of the NOR circuit 8005 is connected to the input pin 8009, and the other input terminal of the NOR circuit 8005 is connected to an inverter circuit 8007. The output of the inverter circuit 8007 is connected to the inverter circuit 8006. An output state control pin 8008 is connected to the inverter circuit 8007.

In FIG. 9, a bidirectional pin 9001 is connected to an output terminal of a tristate buffer 9002 and an input terminal of an input buffer 9003. The tristate buffer 9002 is connected to an input pin 9004 and an input and output select pin 9005. The input buffer 9003 is connected to an input pin 9006.

In mask processing, when a signal on the averaging start signal line 1028 is a H (high) level, in synchronous with a clock signal generated by the standard clock generating circuit 1025, the X- and Y-coordinate counter circuits 1011 and 1012 count up a coordinate (x,y), from the coordinate (2,2), sequentially.

When the signal on the averaging start signal line 1028 is a L (low) level, the X- and Y-coordinate counter circuits 1011 and 1012 stop count of the coordinate, so that the coordinate (x,y) is determined. In the coordinate converting circuit 1015, an address A(x,y) of the pixels 1004 is determined in accordance with the coordinate (x,y). Therefore, image data D(x,y) of the address A(x,y) in the pixels 1004 is mask-processed.

Figures 3, 4A, 4B:
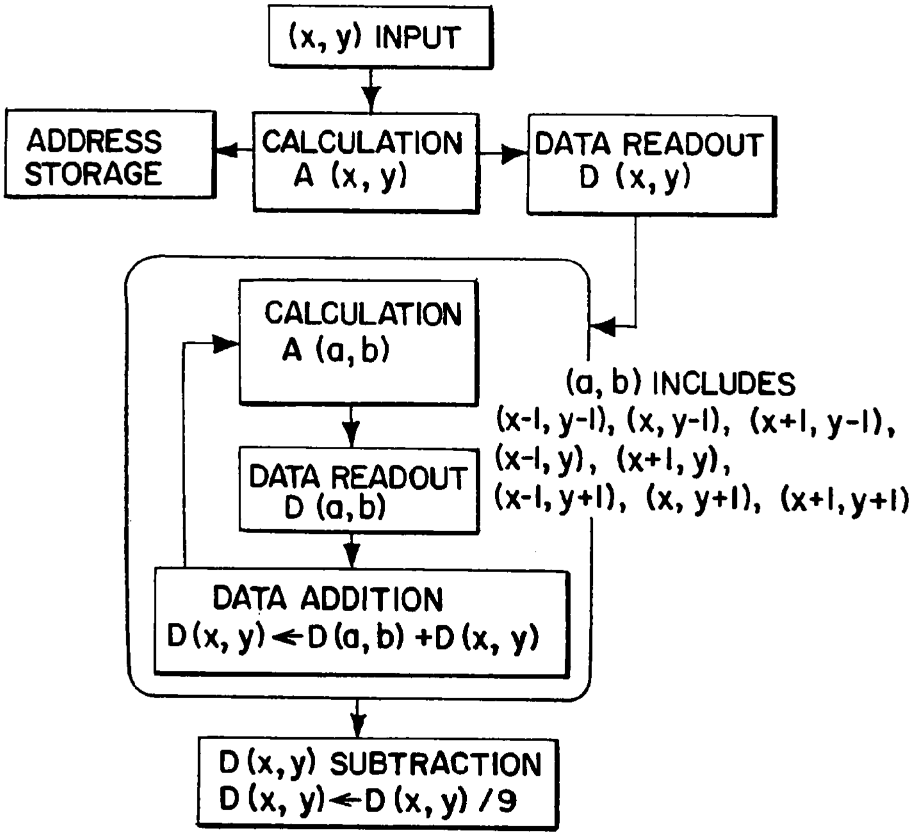
FIG. 3 shows steps of an algorithm for mask processing.
FIGS. 4A and 4B show examples of image data.

FIG. 3 shows steps of algorithm for mask processing. The address A(x,y) determined by the coordinate converting circuit 1015 is stored in the address holding circuit 1016 and output to the memory device 2001 through the address buffers 1018 and the address buses 1019 at the same time. The image data D(x,y) is read out from the memory device 2001 by the MPU 2002 and output to the data processing circuit 1014. As the image data, gradation data is used.

In FIG. 4A, eight addresses A(x−1,y−1), A(x,y−1), A(x+1, y−1), A(x−1,y), A(x+1,y), A(x−1,y+1), A(x,y+1), and A(x+1,y+1) around the address A(x,y) in the pixels 1004 are generated. Therefore, in FIG. 4B, image data D(x−1,y−1), D(x, y−1), D(x+1,y−1), D(x−1,y), D(x+1,y), D(x−1,y+1), D(x,y+1), and D(x+1,y+1) corresponding to these addresses A(x,y) are sequentially read out from the memory device 2001 and output to the data processing circuit 1014. In the data processing circuit 1014, these image data D(x,y) are sequentially added. The added result is divided by nine corresponding to the total number of the image data D, to obtain the averaged image data D'(x,y) of the address A(x,y).

When a write signal is input from the memory device control circuit 1013 to the memory device 2001, through the address buffers 1018 and address buses 1019, the address A(x,y) is input from the address holding circuit 1016 to the memory device 2001 and stored. At the same time, through the data buses 1022, the averaged image data D'(x,y) is input from the data processing circuit 1014 to the memory device 2001 and stored.

Figure 6:
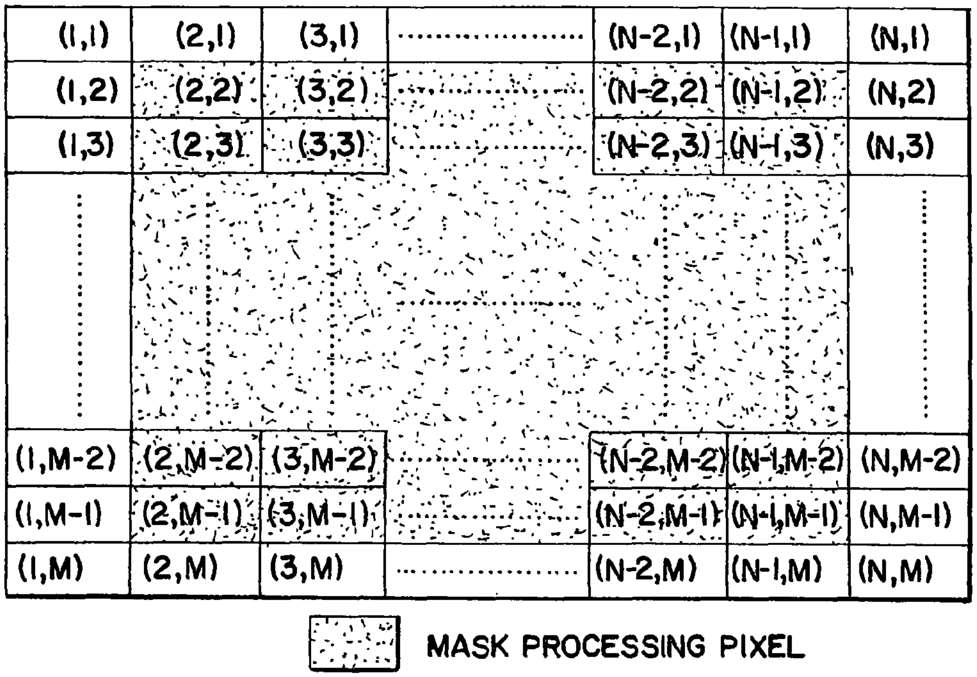
FIG. 6 shows a pixel range in which mask processing is performed.

The above processing is performed for the pixels 1004 with respect to addresses A(2,2) to A(N−1,M−1), as shown in FIG. 6, to mask-process the entire image.

In order to perform the algorithm of FIG. 3, the memory device control circuit 1013 is set to be a read state and input and output of the bidirectional buffers 1021 may be changed by the input and output control circuit 1017.

Figure 5:
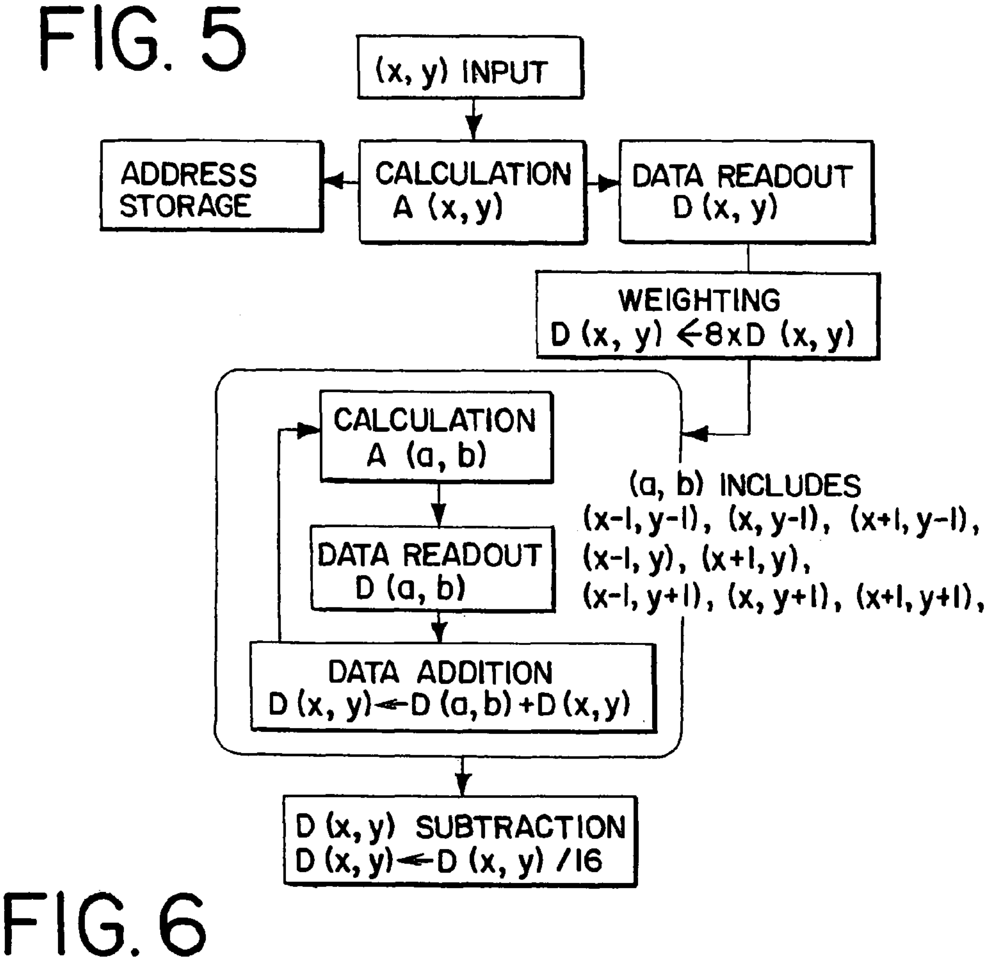
FIG. 5 shows steps of an algorithm which data is weighted for mask processing.

In this algorithm, the image data D(x,y) is averaged simply. However, the image data D(x,y) may be weighted. FIG. 5 shows an algorithm for weighting the image data D(x,y) to enhance the averaged image data D'(x,y).

The address A(x,y) determined by the coordinate converting circuit 1015 is stored in the address holding circuit 1016 and output to the memory device 2001 through the address buffers 1018 and the address buses 1019 at the same time. The image data D(x,y) is read out from the memory device 2001 by the MPU 2002 and output to the data processing circuit 1014. In the data processing circuit 1014, the weighted image data D(x,y) is obtained by multiplying the image data D(x,y) by eight representing the total number of image data D(x,y) to be added later.

In FIG. 4A, eight addresses A(x−1,y−1), A(x,y−1), A(x+1, y−1), A(x−1,y), A(x+1,y), A(x−1,y+1), A(x,y+1), and A(x+1,y+1) around the address A(x,y) in the pixels 1004 are generated. Therefore, in FIG. 4B, image data D(x−1,y−1), D(x, y−1), D(x+1,y−1), D(x−1,y), D(x+1,y), D(x−1,y+1), D(x,y+1), and D(x+1,y+1) corresponding to these addresses A(x,y) are sequentially read out from the memory device 2001 and output to the data processing circuit 1014. In the data processing circuit 1014, these image data D(x,y) are sequentially added to the weighted image data D(x,y). The result is divided by sixteen, to obtain the averaged image data D'(x,y) of the address A(x,y).

Embodiment 2

In Embodiment 1, only one external memory device is provided in the active matrix panel 1001. In this case, since original image data is overwritten, a mask-processing result cannot be confirmed. Therefore, in Embodiment 2, two external memory devices are provided outside the active matrix panel 1001, so that image data before and after mask processing are stored.

Figure 7:
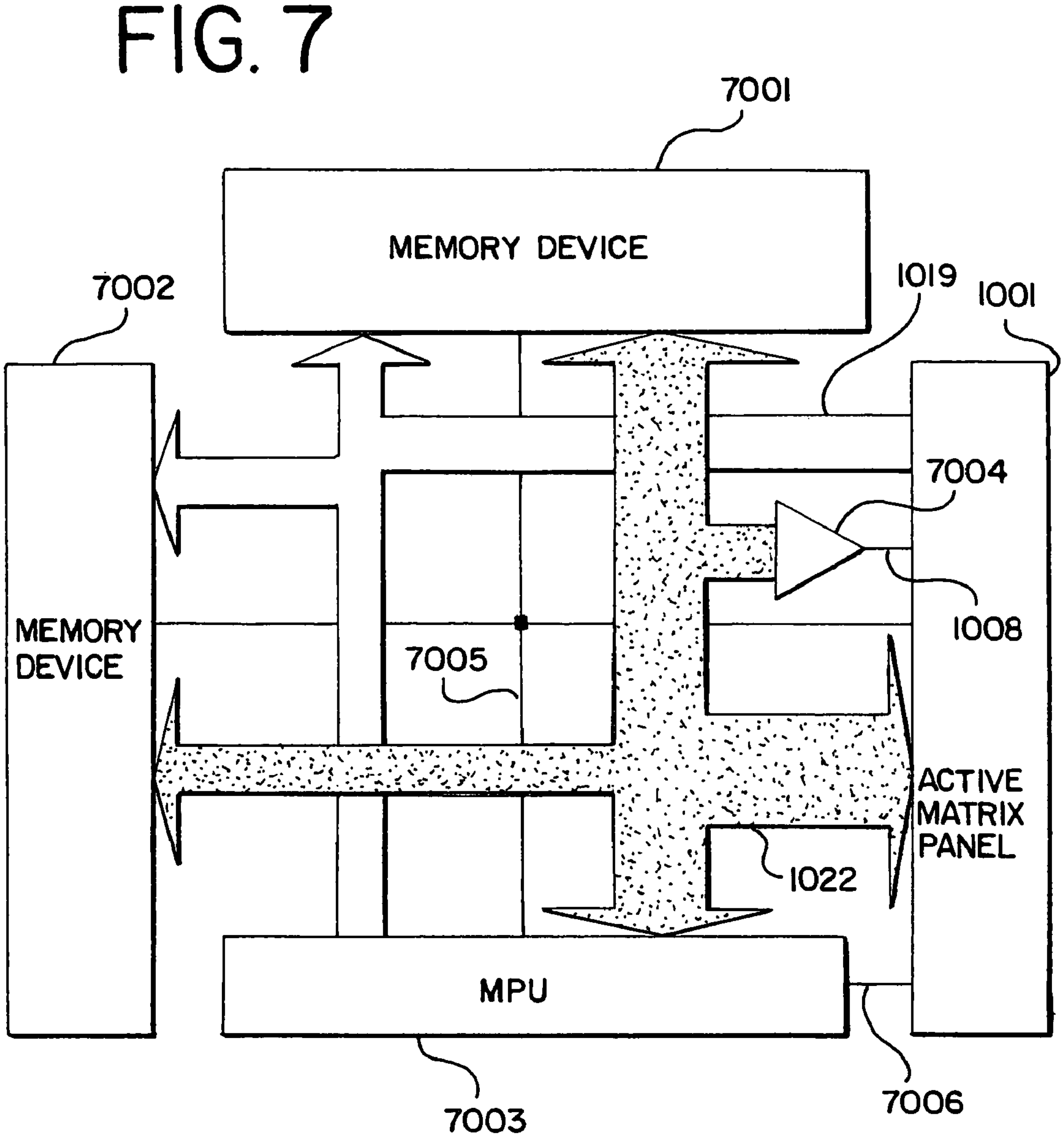
FIG. 7 shows a display system of another embodiment.

FIG. 7 shows a display system of Embodiment 2. The active matrix panel is the same structure as that in Embodiment 1. Two memory devices 7001 and 7002 for storing image data and an MPU 7003 for controlling the entire system are provided outside the active matrix panel 1001. The outputs of the active matrix panel 1001 and the MPU 7003 are connected to the memory devices 7001 and 7002 through address buses 1019. Through the data buses 1022, the active matrix panel 1001, the memory devices 7001 and 7002, and the MPU 7003 are connected each other to input and output a signal (data). The data buses 1022 are connected to a D/A converter 7004 which is connected to the active matrix panel 1001 through the video signal line 1008. The memory device control line 7005 connects with the active matrix panel 1001, the memory devices 7001 and 7002, and the MPU 7003 each other. Through a control signal line 7006, the active matrix panel 1001 is connected to the MPU 7003.

In mask processing, the algorithm of FIG. 3 or 5 is used. Image data stored in the memory device 7001 is mask-processed, and then the mask-processed image data is stored in the memory device 7002.

Embodiment 3

In Embodiments 1 and 2, examples of mask processing for the entire image are described. In Embodiment 3, in order to further shorten the processing time, mask processing is not performed for an area which is not necessary to mask-process.

Figure 11:
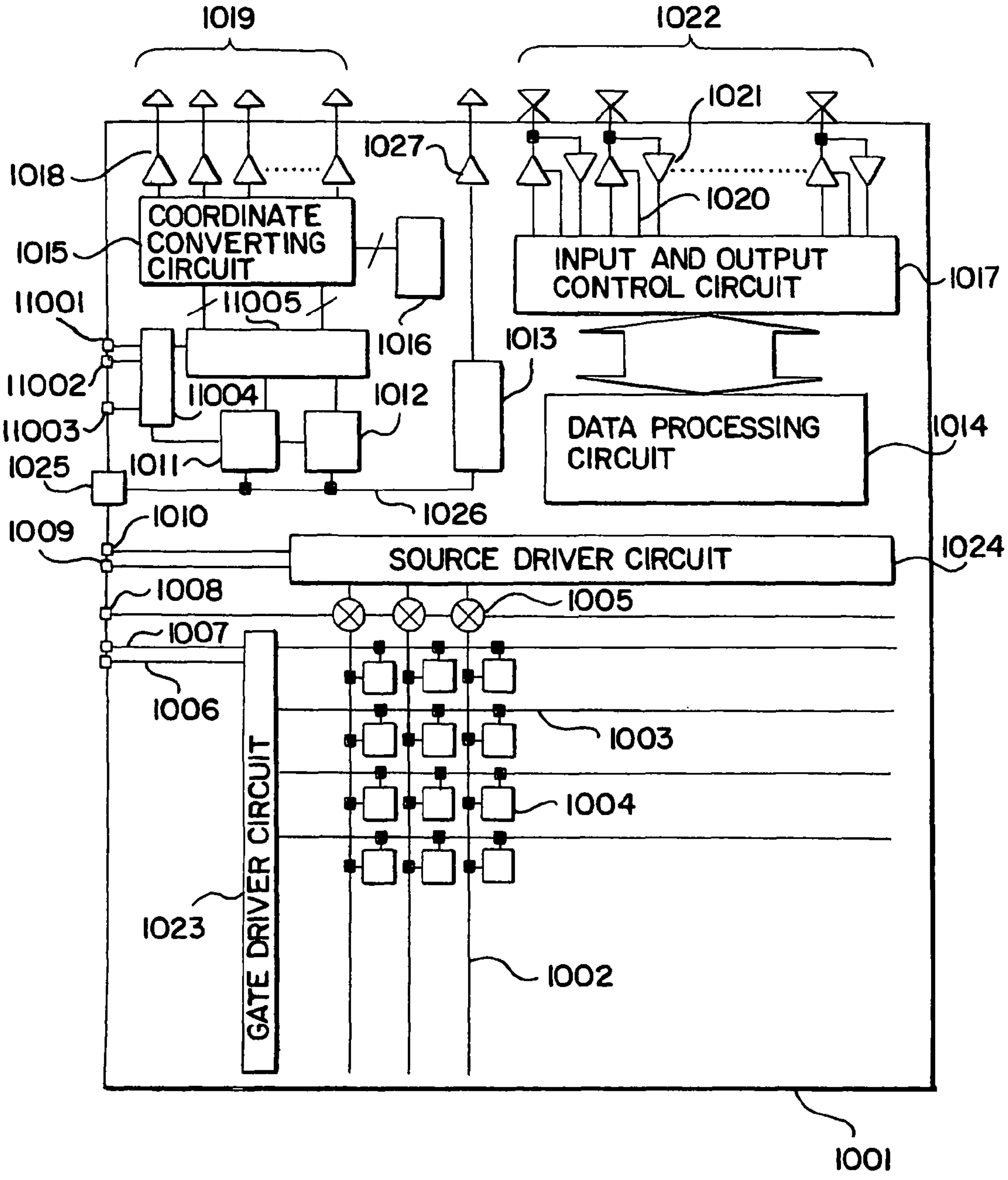
FIG. 11 shows an active matrix panel of another embodiment.
Figure 12:
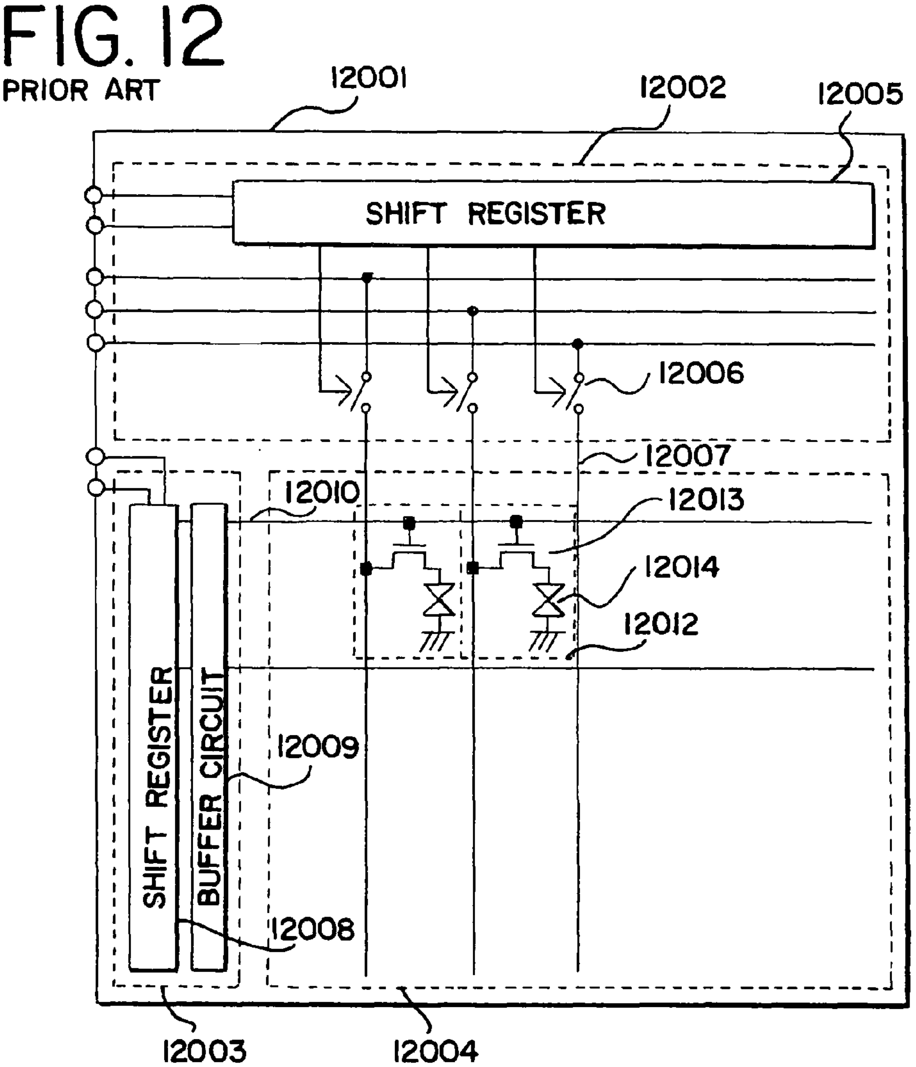
FIG. 12 PRIOR ART
FIG. 12 shows a conventional active matrix panel.
Figure 13:
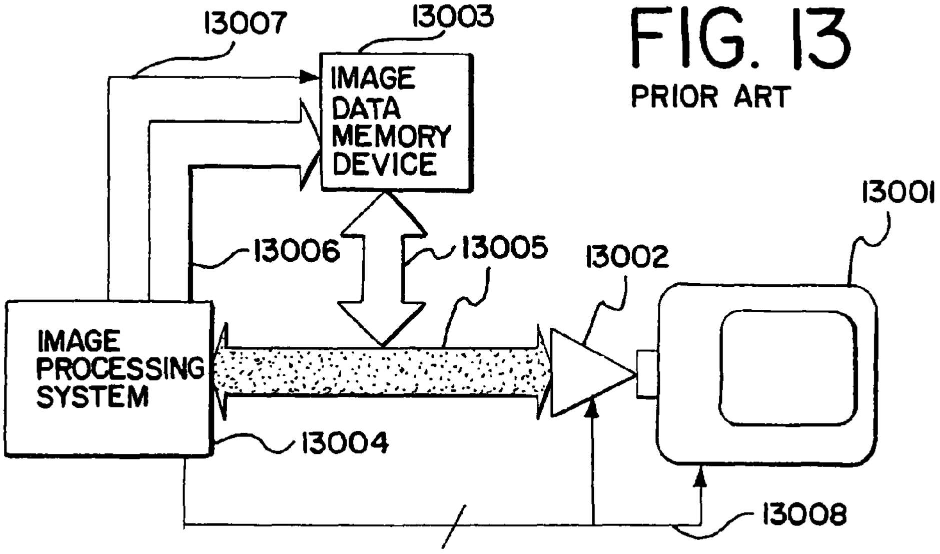
FIG. 13 PRIOR ART
FIG. 13 shows a conventional data processing system.

FIG. 11 shows an active matrix panel of the embodiment. The active matrix panel is the same structure as that in FIG. 1 except for a circuit for designating an address of a pixel. In FIG. 11, the outputs of an X-direction mask processing start/end signal line 11001, a Y-direction mask processing start/end signal line 11002, and a mask processing start signal line 11003 are connected to a subtraction circuit 11004. The output of the subtraction circuit 11004 is connected to the X- and Y-coordinate counter circuits 1011 and 1012 and the coordinate converting circuit 1015. The subtraction circuit 11004 and a coordinate value generating circuit 11005 are formed by a P-type, an N-type, or a complementary type MOS TFT, or a thin film diode of MIM (metal-insulator metal), NIN, PIP, PIN, NIP or the like.

The active matrix panel has, as similar to Embodiment 1, N×M pixels (N is the number of X-direction pixels and M is the number of Y-direction pixels). In the following symbols i, j, k, and l, the relationships $l<i$, $k<N$, $l<j$, and $l<M$ is set.

In mask processing, a mask processing start signal is input from the mask processing start signal line 11003 to the subtraction circuit 11004. Also, From the X- and Y-direction mask processing start/end signal lines 11001 and 11002, a start coordinate (i,j) and an end coordinate (k,l) which are mask-processed are input to the subtraction circuit 11004. In the subtraction circuit 11004, an X-direction counter end value ($p=k-l+1$ and a Y-direction counter end value ($q=l-j+1$) are calculated, so that control is performed to reset the counter value of the X-coordinate counter circuit 1011 by using a p-value and to reset the counter value of the Y-coordinate counter circuit 1012 by using a q-value. Therefore, the X-coordinate counter circuit 1011 is a p-coded (including binary, decimal or the like) counter circuit, and the Y-coordinate counter circuit 1012 is a q-coded (including binary, decimal or the like) counter circuit.

Figure 10:
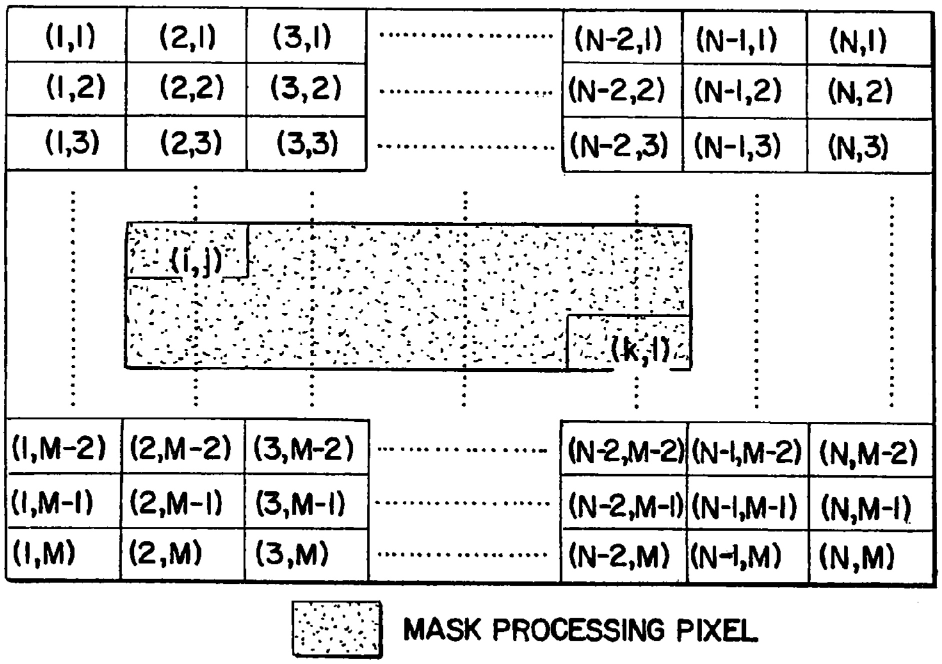
FIG. 10 shows an example of mask processing to a portion of display area.

In the coordinate generating circuit 11005, addresses (i+X-coordinate counter value, j+Y-coordinate counter value) are calculated to generate the addresses A(x,y) representing an area to be mask-processed. The algorithm of Embodiment 1 is executed for the pixels 1004 corresponding to the generated addresses A(x,y), so that mask processing is performed for only an area of FIG. 10 in the pixels 1004.

In the embodiment, in order to store image data before and after mask processing, as shown in Embodiment 2, two or more memory devices may be provided.

As described above, by the present invention, in an active matrix panel formed by TFTs or the like, a circuit having a logic function such as data processing is formed by TFTs or the like on the same substrate. Therefore, without increasing a processing time of a MPU, image processing such as noise removal can be performed at a high speed. Also, miniaturization of a system can be realized.

What is claimed is:

1. A semiconductor device comprising:

a first substrate;

a second substrate opposite to the first substrate;

a liquid crystal arranged between the first substrate and a second substrate;

a plurality of gate lines formed over the first substrate;

a plurality of source lines formed over the first substrate;

a plurality of pixel thin film transistors formed over the first substrate, and formed in intersections of the plurality of gate lines and the plurality of source lines;

a gate line driver circuit connected to the plurality of gate lines;

a source line driver circuit connected to the plurality of source lines; and a designate circuit configured to designate one of address of the plurality of pixel thin film transistors, comprising:

a counter circuit comprising a first thin film transistor over the first substrate;

a memory device control circuit comprising a second thin film transistor over the first substrate, configured to generate a clock signal to control read and write to an external memory device; and a standard clock generator circuit, wherein an output of the standard clock generator circuit is connected to the counter circuit and the memory device control circuit.

2. The semiconductor device according to claim 1, wherein the gate line driver circuit comprises a third thin film transistor formed over the first substrate, and wherein the source line driver circuit comprises a fourth thin film transistor formed over the first substrate.

3. The semiconductor device according to claim 1, wherein the standard clock generator circuit comprises a fifth thin film transistor formed over the first substrate.

4. The semiconductor device according to claim 1, further comprising:

a data processing circuit comprising a sixth thin film transistor over the first substrate, configured to perform image processing; and an input and output control circuit connected to the data processing circuit, comprising a seventh thin film transistor over the first substrate.

5. The semiconductor device according to claim 1, further comprising:

a microprocessing unit, wherein the microprocessing unit, the external memory and the designate circuit are configured to perform mask-processing.

6. A semiconductor device comprising:

a first substrate;

a second substrate opposite to the first substrate;

a liquid crystal arranged between the first substrate and a second substrate;

a plurality of gate lines formed over the first substrate;

a plurality of source lines formed over the first substrate;

a plurality of pixel thin film transistors formed over the first substrate, and formed in intersections of the plurality of gate lines and the plurality of source lines;

a gate line driver circuit connected to the plurality of gate lines;

a source line driver circuit connected to the plurality of source lines; and a designate circuit configured to designate one of address of the plurality of pixel thin film transistors, comprising:

a counter circuit comprising a first thin film transistor over the first substrate;

a subtraction circuit comprising a eighth thin film transistor over the first substrate;

a coordinate value generating circuit comprising a ninth thin film transistor over the first substrate;

a memory device control circuit comprising a second thin film transistor over the first substrate, configured to generate a clock signal to control read and write to an external memory device; and a standard clock generator circuit, wherein an output of the standard clock generator circuit is connected to the counter circuit and the memory device control circuit.

7. The semiconductor device according to claim 6, wherein the gate line driver circuit comprises a third thin film transistor formed over the first substrate, and wherein the source line driver circuit comprises a fourth thin film transistor formed over the first substrate.

8. The semiconductor device according to claim 6, wherein the standard clock generator circuit comprises a fifth thin film transistor formed over the first substrate.

9. The semiconductor device according to claim 6, further comprising:

a data processing circuit comprising a sixth thin film transistor over the first substrate, configured to perform image processing; and an input and output control circuit connected to the data processing circuit, comprising a seventh thin film transistor over the first substrate.

10. The semiconductor device according to claim 6, further comprising:

a microprocessing unit, wherein the microprocessing unit, the external memory and the designate circuit are configured to perform mask-processing.

11. A semiconductor device comprising:

a first substrate;

a second substrate opposite to the first substrate;

a liquid crystal arranged between the first substrate and a second substrate;

a plurality of gate lines formed over the first substrate;

a plurality of source lines formed over the first substrate;

a plurality of pixel thin film transistors formed over the first substrate, and formed in intersections of the plurality of gate lines and the plurality of source lines;

a gate line driver circuit connected to the plurality of gate lines;

a source line driver circuit connected to the plurality of source lines; and a designate circuit configured to designate one of address of the plurality of pixel thin film transistors, comprising:

a counter circuit comprising a first thin film transistor over the first substrate;

a memory device control circuit configured to generate a clock signal to control read and write to an external memory device; and a standard clock generator circuit comprising a second thin film transistor over the first substrate, wherein an output of the standard clock generator circuit is connected to the counter circuit and the memory device control circuit.

12. The semiconductor device according to claim 11, wherein the gate line driver circuit comprises a third thin film transistor formed over the first substrate, and wherein the source line driver circuit comprises a fourth thin film transistor formed over the first substrate.

13. The semiconductor device according to claim 11, wherein the standard clock generator circuit comprises a fifth thin film transistor formed over the first substrate.

14. The semiconductor device according to claim 11, further comprising:

a data processing circuit comprising a sixth thin film transistor over the first substrate, configured to perform image processing; and an input and output control circuit connected to the data processing circuit, comprising a seventh thin film transistor over the first substrate.

15. The semiconductor device according to claim 11, further comprising:

a microprocessing unit, wherein the microprocessing unit, the external memory and the designate circuit are configured to perform mask-processing.

16. A semiconductor device comprising:

a first substrate;

a second substrate opposite to the first substrate;

a liquid crystal arranged between the first substrate and a second substrate;

a plurality of gate lines formed over the first substrate;

a plurality of source lines formed over the first substrate;

a plurality of pixel thin film transistors formed over the first substrate, and formed in intersections of the plurality of gate lines and the plurality of source lines;

a gate line driver circuit connected to the plurality of gate lines;

a source line driver circuit connected to the plurality of source lines; and a designate circuit configured to designate one of address of the plurality of pixel thin film transistors, comprising:

a counter circuit comprising a first thin film transistor over the first substrate;

a subtraction circuit comprising a eighth thin film transistor over the first substrate;

a coordinate value generating circuit comprising a ninth thin film transistor over the first substrate;

a memory device control circuit configured to generate a clock signal to control read and write to an external memory device; and a standard clock generator circuit comprising a second thin film transistor over the first substrate, wherein an output of the standard clock generator circuit is connected to the counter circuit and the memory device control circuit.

17. The semiconductor device according to claim 16, wherein the gate line driver circuit comprises a third thin film transistor formed over the first substrate, and wherein the source line driver circuit comprises a fourth thin film transistor formed over the first substrate.

18. The semiconductor device according to claim 16, wherein the standard clock generator circuit comprises a fifth thin film transistor formed over the first substrate.

19. The semiconductor device according to claim 16, further comprising:

a data processing circuit comprising a sixth thin film transistor over the first substrate, configured to perform image processing; and an input and output control circuit connected to the data processing circuit, comprising a seventh thin film transistor over the first substrate.

20. The semiconductor device according to claim 16, further comprising:

a microprocessing unit, wherein the microprocessing unit, the external memory and the designate circuit are configured to perform mask-processing.

* * * * *